United States Patent [19]

Nishikawa et al.

[11] Patent Number: 4,841,439

[45] Date of Patent: Jun. 20, 1989

[54] METHOD FOR RESTARTING EXECUTION INTERRUPTED DUE TO PAGE FAULT IN A DATA PROCESSING SYSTEM

[75] Inventors: Atsuhiko Nishikawa, Mito; Yoshihiro Miyazaki, Hitachi; Masayuki Tanji, Hitachi; Soichi Takaya, Hitachi; Shinichiro Yamaguchi, Hitachi, all of Japan

[73] Assignee: Hitachi, Ltd., Tokyo, Japan

[21] Appl. No.: 917,974

[22] Filed: Oct. 14, 1986

[30] Foreign Application Priority Data

Oct. 11, 1985 [JP] Japan .............................. 60-224765

[51] Int. Cl.⁴ .............................................. G06F 12/00
[52] U.S. Cl. .................................... 364/200; 371/13; 364/265.3; 364/265
[58] Field of Search ... 364/200 MS File, 900 MS File; 371/12, 13

[56] References Cited

U.S. PATENT DOCUMENTS

| | | | |
|---|---|---|---|
| 3,555,517 | 1/1971 | Heath, Jr. et al. | 271/12 X |
| 3,736,566 | 5/1973 | Anderson et al. | 371/12 |
| 4,045,661 | 8/1977 | Antoine et al. | 371/12 |
| 4,110,822 | 8/1978 | Porter et al. | 364/200 |

*Primary Examiner*—Gareth D. Shaw
*Assistant Examiner*—Paul Kulik
*Attorney, Agent, or Firm*—Antonelli, Terry & Wands

[57] ABSTRACT

The present application invention relates to a method for restarting execution of an instruction interrupted due to a page fault. When a page fault occurs during an execution of an instruction, the pertinent page is loaded from an external storage into the main memory and then the access which has caused the page fault is executed again. After N steps of the microprogram that has executed the page fault access, the page fault exception processing is initiated and at the save/restore operation of the content of the microprogram counter, the content of the microprogram is decremented by N, thereby restarting the execution of the instruction beginning from the step of the microprogram which has achieved the page fault access.

4 Claims, 16 Drawing Sheets

MICROPROGRAM FOR MEMORY READ

MICROPROGRAM FOR MEMORY WRITE

METHOD FOR RESTARTING EXECUTION INTERRUPTED DUE TO PAGE FAULT IN A DATA PROCESSING SYSTEM

BACKGROUND OF THE INVENTION

1. Field of the Invention

The present invention relates to a data processing system, and in particular, to a method for restarting an execution of an instruction interrupted due to a page fault which has occurred during the execution of the instruction.

In a data processing system using an on-demand paging system, a page for which a memory access is attempted may be missing in the main memory in some cases. This condition is called a page fault. When a page fault occurs, the pertinent page must be first loaded from an external storage into the main memory and then the access must be initiated again.

Two kinds of memory accesses are available, namely, an instruction read and an operand read/write. The latter is accomplished while an instruction is being executed, and hence the content of an internal register or the main memory may have possibly been altered before the access that has caused the page fault. To overcome this difficulty, a special processing is necessary in a case where the load processing is executed for the reexecution of the instruction after an occurrence of a page fault.

The methods for restarting the execution of an instruction interrupted due to a page fault include a method for reexecuting the instruction from the beginning as described in the JP-A-52-86741 and a method for reexecuting the instruction from the interruption point thereof as described in the JP-A-55-28190.

In the former method, a memory access is provisionally executed before the content of the internal register or the main memory is changed, and after it is confirmed that the page fault does not take place, the content of the internal register or the main memory is changed. In this case, even if a page fault occurs at the provisional execution, since the content of the internal register or the main memory has not been changed, the reexecution can be achieved from the beginning of the instruction and hence the internal information need not be saved. However, the method in which an actual execution is effected after all necessary pages are confirmed to exist in the main memory requires an increase of the amount of hardware due to an addition of a special, sequential control circuit dedicated to the provisional execution or leads to a reduction of the processing speed due to an insertion of the processing step to perform the provisional execution. The provisional execution is quite difficult in a case of an instruction for processing a character string or a list where a great number of memory accesses are required and the result cannot be predicted.

In the latter method, namely, the retry method, the information items indicating the interruption point of the instruction such as the contents of the microprogram counter and the microprogram counter stack are saved during the execution of the instruction, so that at an occurrence of a page fault thereafter, the restart can be accomplished beginning from the interruption point. However, this method leads to an increase of hardware dedicated to the processing to save the information items or to a reduction of the processing speed due to an insertion of the processing steps to save the information items. Assuming the microprogram counter to be of the 14-bit configuration, the increase of the hardware dedicated to the save processing is about 14 bits×(4 FF gates+1 selector gate)×9=630 gates. The influence of the hardware increase is considerable in a circuit, for example, an ECL circuit in which the degree of integration cannot be easily increased.

SUMMARY OF THE INVENTION

It is therefore an object of the present invention to provide a method for restarting the execution of an instruction interrupted due to a page fault during an execution of the instruction which minimizes the disadvantages of the prior art techniques.

The present invention is characterized in that a page fault is detected by use of an address next to a microprogram address at which the restart is achieved and in that the restart is executed beginning from an address obtained by subtracting one from the address for which the page fault is detected.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
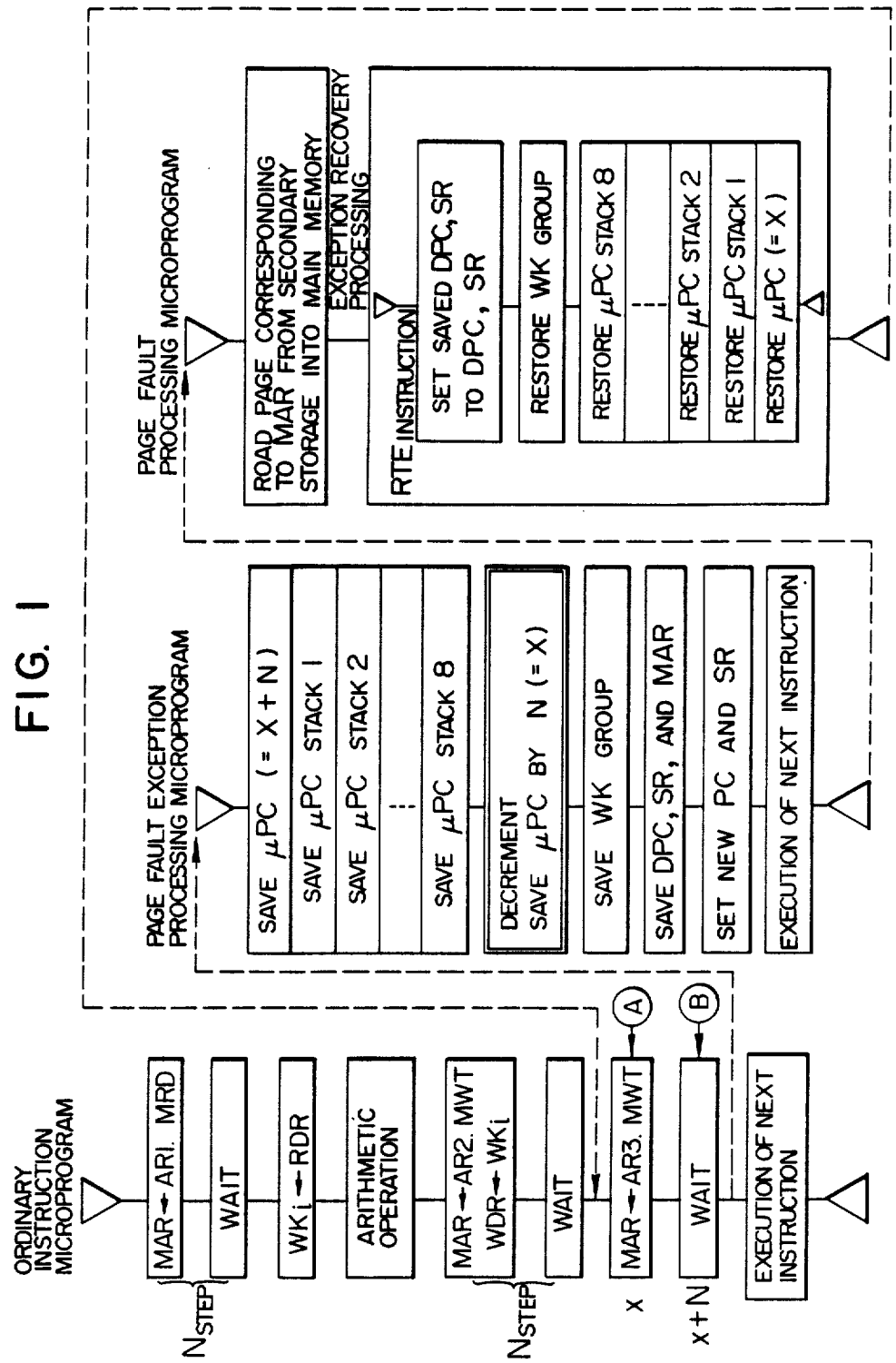
FIG. 1 is a flowchart demonstrating an embodiment of the present invention.

FIG. 1 is a flowchart illustrating a method for restarting an execution of a microprogram for an ordinary instruction at an occurrence of a page fault. In this example, when N steps are executed after an access activation microprogram is initiated to access the main storage, a microprogram for waiting for a reply with respect to the access start is executed.

The ordinary instruction microprogram of FIG. 1 stores the result obtained by executing an operation into the main memory (to be referred to as a memory herebelow). After the content of an address register AR1 is set to a memory register MAR, the memory is activated (Memory Read, MRD). After N steps are executed, the microprogram for waiting for a reply to the memory activation is executed. When data is read from the memory, the data (content of the Read Data Register) is moved to a work register WKi and then an operation is accomplished by use of the data, thereby storing the result of the operation into the memory.

In a case of a subtraction, the operation result includes a quotient and a remainder. In the example of FIG. 1, the quotient and the remainder are written in the memory in this sequence, respectively.

In an operation for writing the quotient, the content of the address register R2 is set to the memory address register MR2 to specify a memory address for the write operation. The content (the quotient of the operation result) of the work register WKi is set to the data register, Write Data Register (WDR) and then a memory write operation is initiated (MWT). After N steps are executed, a microprogram (WAIT) for waiting for a reply indicating whether or not the write operation has been correctly executed is started. When the write operation is confirmed to have been appropriately accomplished, the operation to write the remainder is initiated. Although the remainder has been stored in a work register, the operation is not shown in the diagram. Here, in step A, the content of the address register AR3 is only set to the memory address register MAR and thereafter the memory write is initiated (MWT). Assume that for a memory activation at the step A, a page fault is detected at the step B in the microprogram to wait for a reply initiated N steps after Step A. When a page fault is detected, control branches to the page fault exception processing microprogram. The page fault exception processing microprogram performs a processing for saving the content of the microprogram counter and the contents of the registers (microprogram counter stack) used by the microprogram to call subroutines, a processing to decrement the content of the saved microprogram counter by N, a processing to save a group of registers (WK's) to be used as a temporary storage for the operation, a processing for saving the decode program counter (DPC), the status register (SR), and the memory address register (MAR), and a processing for setting the program counter (New PC) and the status register (New SR) used to execute the page fault processing microprogram; and thereafter control proceeds to a processing to execute the next instruction. According to the next instruction, the page fault processing microprogram is executed by use of the New PC and the New SR, namely, a page corresponding to the MAR is first loaded from the secondary storage into the main memory, and then in the exception recovery processing, the microprogram of the return (RTE) instruction is executed. When the RTE instruction is executed, various internal information (DPC, SR, WK group, stacks 1–8) saved by the page fault exception processing microprogram and the microprogram counter are restored, and the instruction execution is restarted from the memory activate microprogram (at a microprogram address x) which has caused the page fault. In this embodiment, when N steps of microprogram are executed after the memory access activation is effected, the microprogram to wait for a response is executed; consequently, whenever a page fault occurs, the microprogram address is updated by N. Before restoring the original state, the content of the microprogram counter saved by the page fault exception processing microprogram is decremented by N; however, in a system where the microprogram to wait for a reply is executed immediately after the memory is activated, namely, a subtraction by one is processed in the page fault exception processing microprogram.

In the embodiment of FIG. 1, a processing to decrement the content of the microprogram counter by N is executed in the page fault exception processing microprogram. Alternatively, if the microprogram counter is saved at the point of page fault and the processing to restore the microprogram counter (subtraction by N) is achieved when the exception is restored, the restart of the instruction execution can also be effected beginning from the memory activation which has caused the page fault.

The value of N can be arbitrarily set. For N=1, the creation of the program is easy but it is difficult to increase the performance. That is, for N=1, after the memory is activated, a wait state is established, namely, the other processing is stopped until a reply is received; consequently, if a long period of time is to elapse before the reply is received, the processing performance (speed) is reduced.

If N is set to 2 or 3, the other processing is executed during the wait state, and hence the processing performance is improved; however, it is necessary to create a processing for executing two or three steps of microprogram in any case after the memory is activated, which causes the programming to be complicated.

Figure 2:
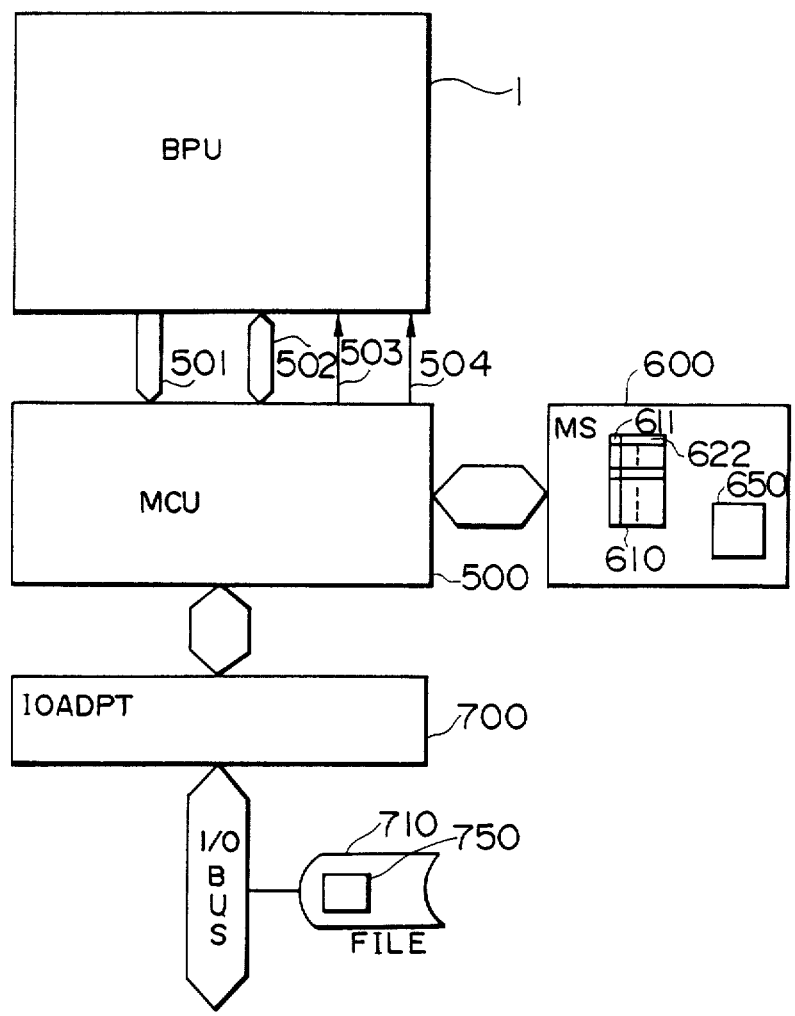
FIGS. 2–8 are schematic diagrams of embodiments in the hardware configuration utilized according to the present invention.

FIG. 2 is a schematic block diagram showing the entire configuration of a data processing system using the on-demand paging system.

A basic processing unit (BPU) 1 performs a memory access on a memory control unit (MCU) 500 via a memory address bus 501 and a memory data bus 502. The MCU 500 references a page table 610 by use of an address transmitted from the BPU 1. The page table 610 comprises a validity flag 611 and a bit string indicating a physical page 622 of the pertinent page. The validity flag 611 indicates that the page exists in the main memory 600. If the flag 611 is cleared, the page 650 requested by the BPU 1 for an access does not exist in the main memory 600. In this case, the MCU 500 notifies the BPU 1 by use of a page fault signal 503 of the condition that the access page is missing in the main memory.

On receiving the signal 503, the BPU 1 initiates a page fault interruption and loads the pertinent page from an external storage 710 into the main memory 600.

Figure 3:
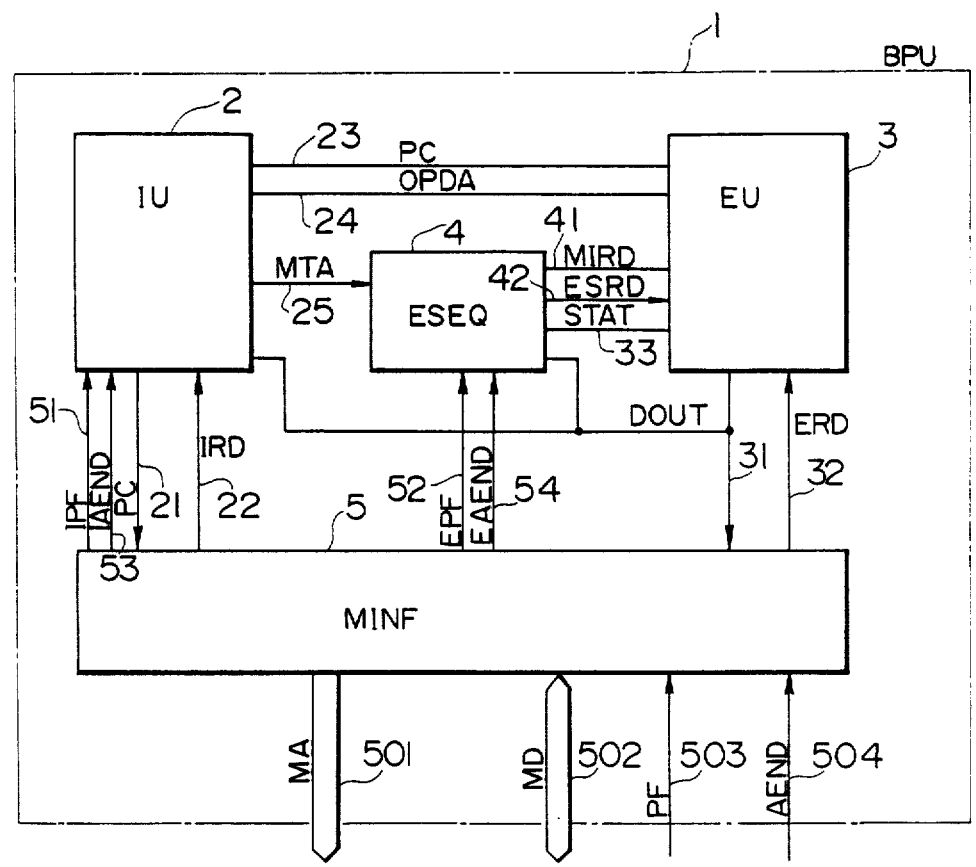

FIG. 3 is a schematic diagram illustrating an embodiment of the BPU 1, which includes a memory interface circuit 5, an instruction interpret unit 2, an execute unit 3, and an execute unit controller 4.

Figure 5:
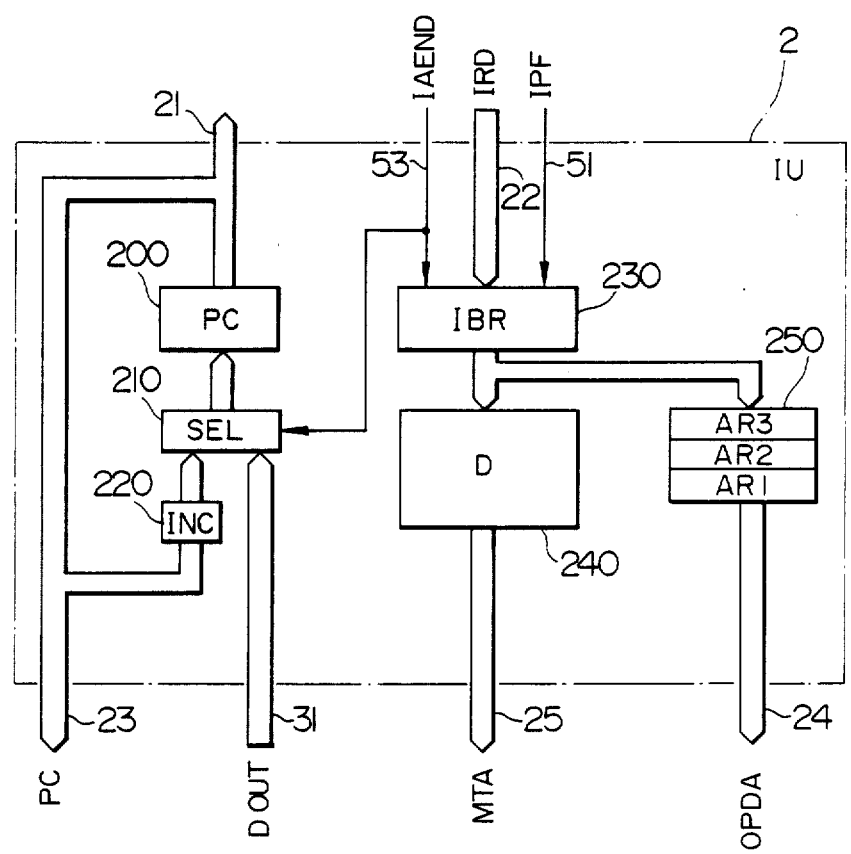

The operation of an instruction will be briefly described. As shown in FIG. 5, the instruction interpret unit (IU) 2 has a program counter (PC) 200 and reads an instruction from an address indicated by the PC 200. An output 21 from the PC 200 is connected via a selector 520 to a memory address register (MAR) 510 in the memory interface unit (MINF) 5.

An output 501 from the MAR 510 is passed as a memory address to the MCU and then the content of the pertinent memory 600, namely, the instruction is read. The data (instruction) thus read is set via the memory data bus 502 to a read data register (RDR) 540 in the MINF 5. An output 22 from the RDR 540 is set to an instruction buffer (IBR) 230 of the IU 2 and then an instruction decoder 240 transfers a first address MTA 25 of the microprogram to the execution unit controller (ESEQ) 4. The operand address is set from the IBR 230 to an address register (AR$_i$(i=1, 2, ...)) 250 and is then passed via the operand address bus (OPDA) 24 to the execute unit (EU) 3.

Figure 6:
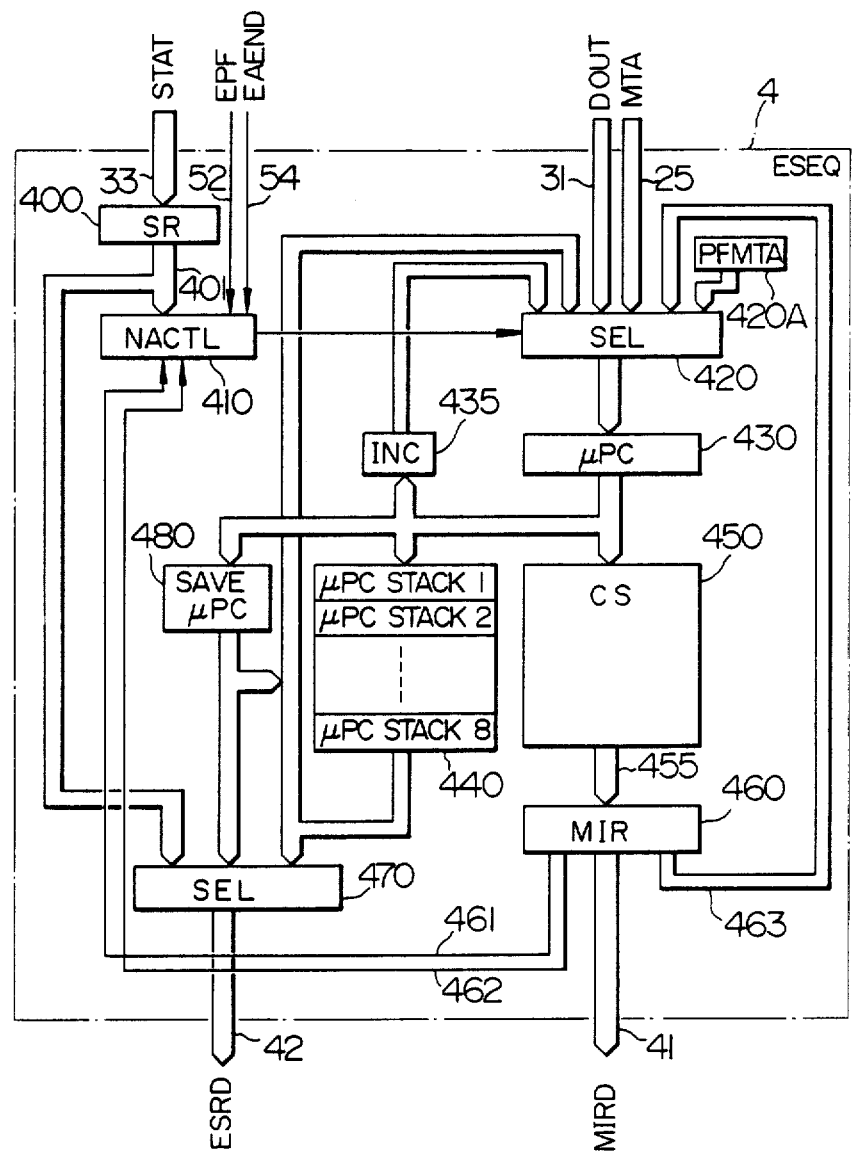

FIG. 6 is a schematic diagram depicting the configuration of the execute unit controller (ESEQ) 4. The MTA 25 generated by the IU 2 is connected via a selector 420 and a microprogram counter ($\mu$PC) 430 to an address input of a control memory (CS) 450, and then a microprogram associated with the instruction is read and is set to a microinstruction register (MIR) 460. An output 41 from the MIR 460 is connected to the execute unit 3 and then the instruction is executed.

Figure 4:
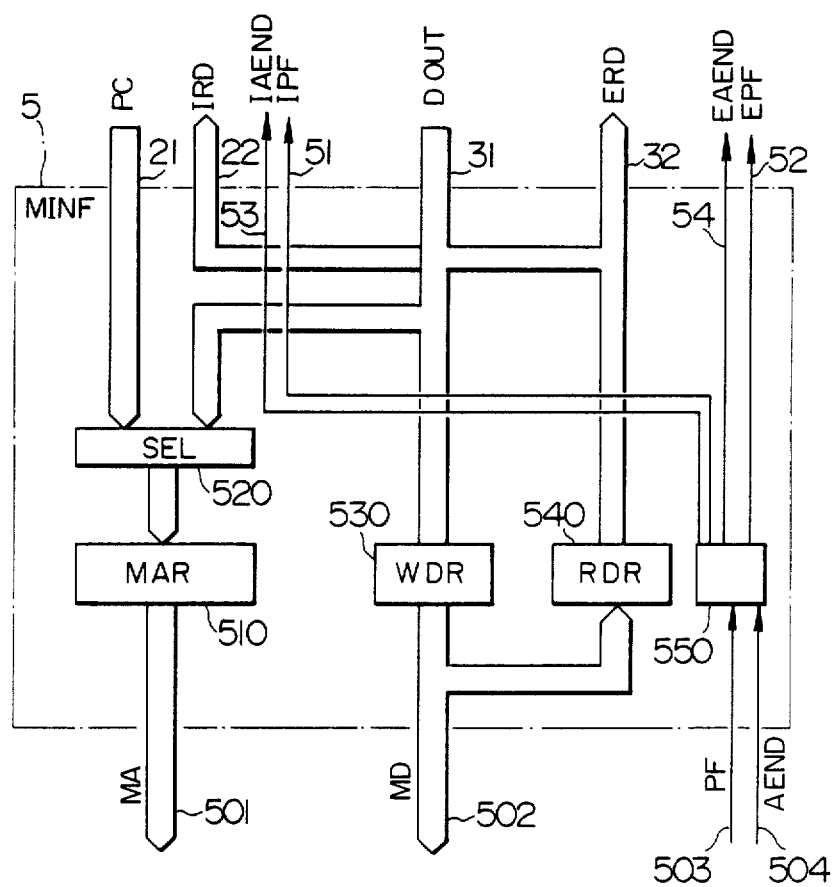
Figure 7:
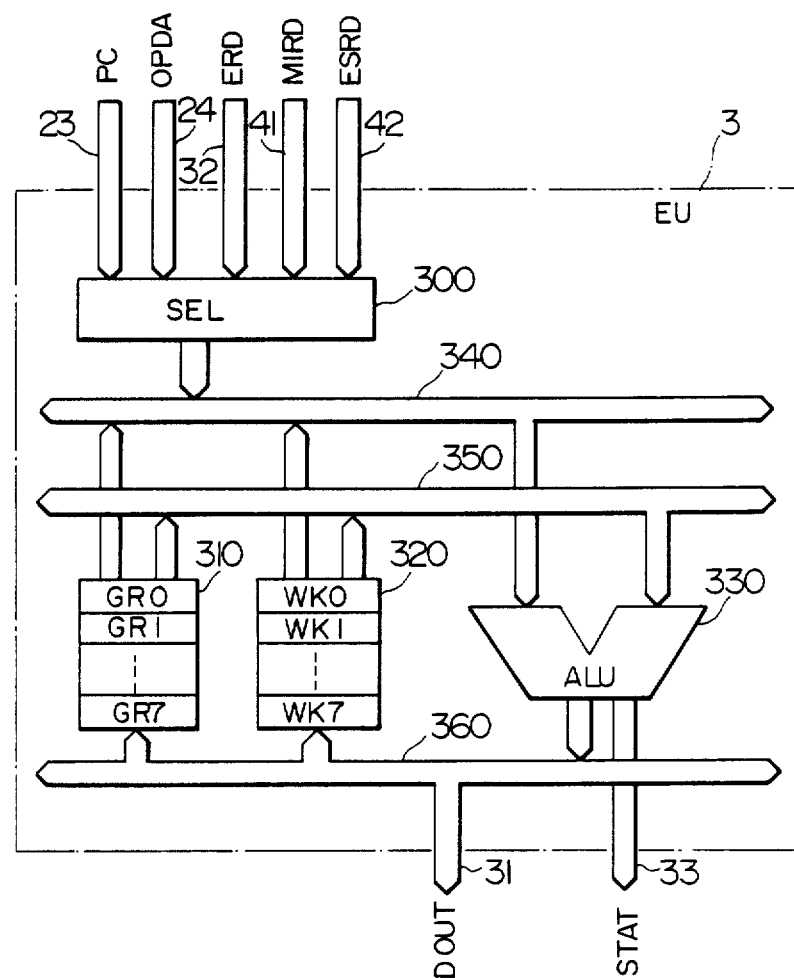

If the instruction includes a memory access, the operand address bus (OPDA) 24 is connected to an output bus 31 of the execution unit 3 via a selector 300, an internal bus 340, an ALU 330, and an internal output bus 360 shown in FIG. 7. The output bus 31 is connected to the MAR 510 via a selector 520 of FIG. 4 and is passed as a memory address 501 to the MCU 500.

Since the data read from the memory 600 is set to the RDR, the data is fetched into the EU 3 via the ERD 32.

Data to be written in the memory is set to a WDR 530 and is then transmitted to the MCU 500.

Since the response time of the memory is undefined, means for determining whether the memory access is finished or not is required.

When the memory access is finished, the MCU 500 sends an access end signal, AEND 504 to the BPU 1. The AEND 504 is distributed from the MINF 5 as an access end signal IAEND 53 for an access to the IU 2 and as an access end signal EAEND 54 for an access to the EU 3.

The EAEND signal 54 for an access to the EU 3 is connected to the execute unit controller 4.

Next, the relationships between the microprogram processing operation and the hardware with respect to the memory access will be described.

Figure 9A:
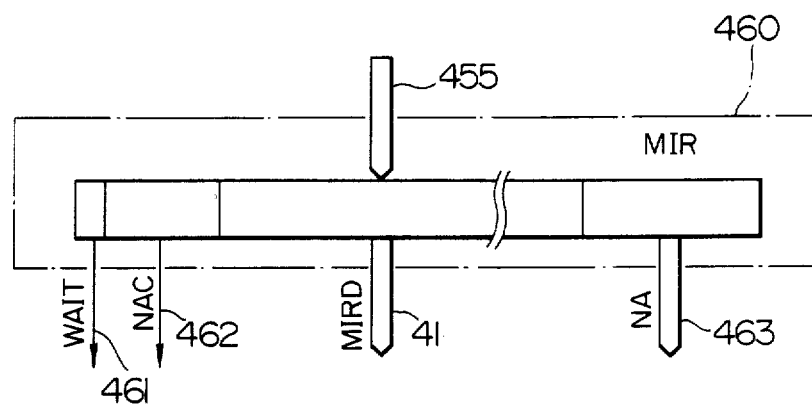
FIGS. 9A–9B are schematic diagrams showing microinstruction formats.

FIG. 9A is a schematic diagram illustrating a format of a microinstruction. A microinstruction register, MIR comprises a bit 461 indicating that the instruction is currently in the wait state, a bit field 462 controlling the next address, a bit field 41 controlling the arithmetic operation system, and a bit field 463 indicating the next address.

Figure 9B:
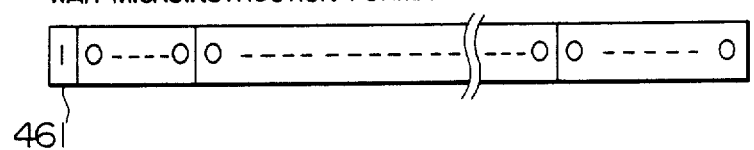

FIG. 9B is a schematic diagram showing a format of a microinstruction in WAIT, namely, a cycle for waiting for a reply after the memory is activated. In this case, only the wait bit 461 is set to 1 and the other bits are entirely set to $\phi$.

A WAIT signal 461 and a next address control signal 462 are connected to a next address controller 410 as shown in FIG. 6.

Figure 8:
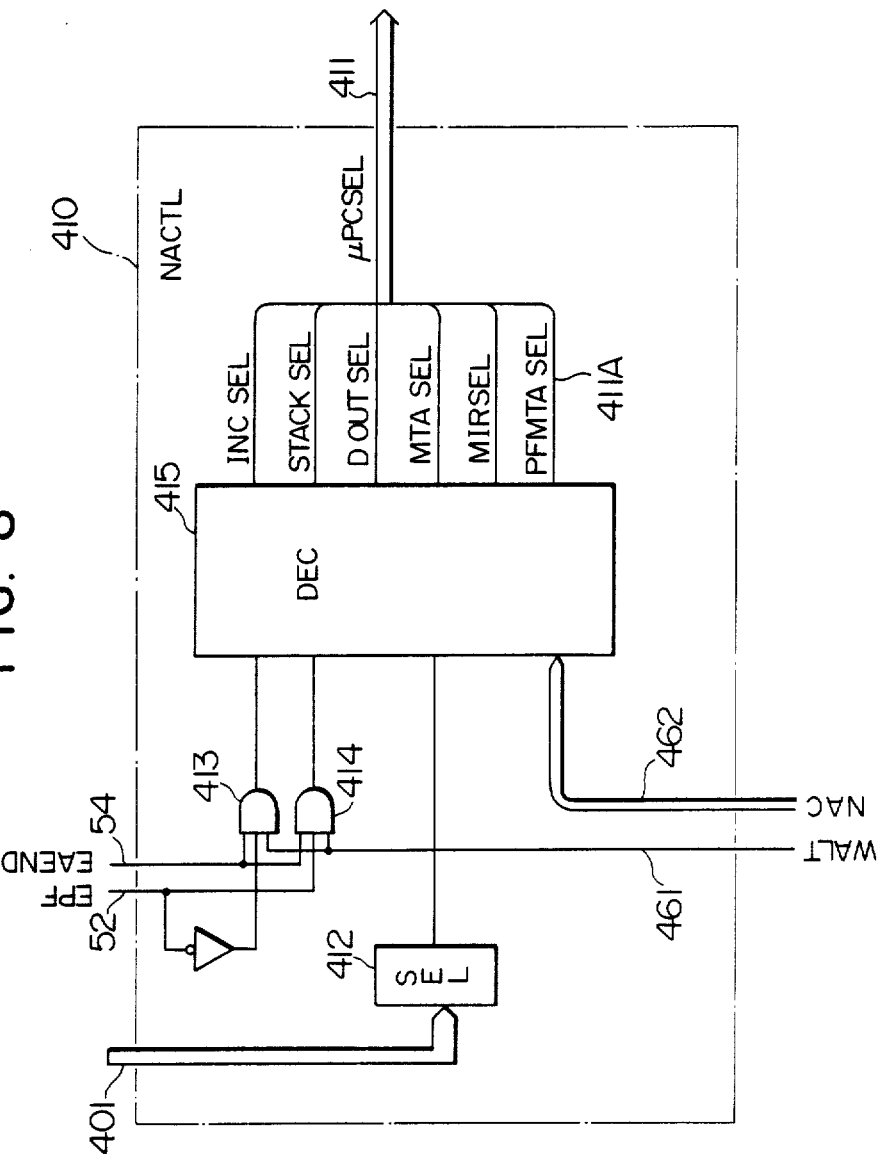

FIG. 8 is a schematic diagram depicting the configuration of the NACTL 410, which comprises a selector 412 for selecting an output 401 from a status register 400, an AND gate 414 for detecting a page fault signal 52, an AND gate 413 for detecting an access end signal 54, and a decoder 415 for generating an address select signal 411 from the NAC signal 462.

The WAIT signal 461 is connected to the inputs of the AND gates 413-414, and when the WAIT signal 461 is 1, the page fault signal 52 and the access end signal 54 contributes to an operation to generate the next address.

Figure 11A:
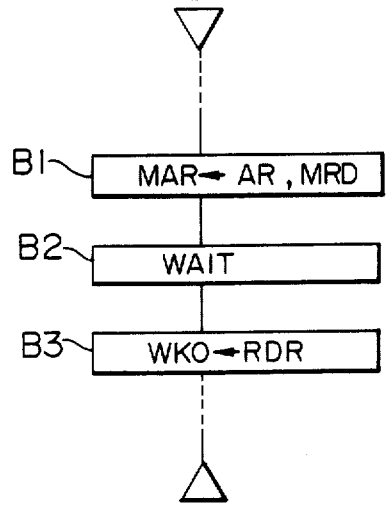
FIGS. 11A–11B are schematic diagrams illustrating microprograms for accessing a memory.

FIG. 11A is a schematic diagram illustrating a microprogram applied to a memory read operation. In a step B1 of this diagram, an address is set to the MAR 510 to activate the memory. In the next step B2, a WAIT cycle is established and only the WAIT signal 461 is set to 1. If an access end signal 54 is inputted in this situation, control proceeds to a step B3; otherwise, the next address is not generated and thus the step B2 is continuously executed. In the step B3, the obtained data is transferred to the WKO 320.

Figure 11B:
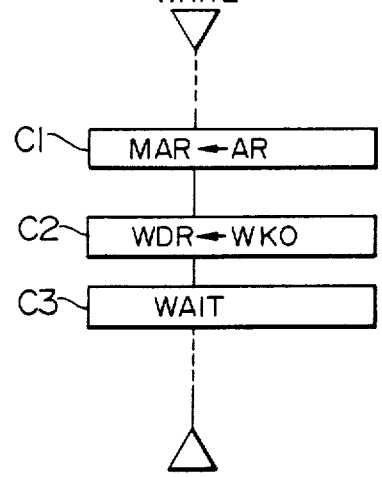

FIG. 11B is a schematic diagram illustrating a microprogram applied to a memory write operation. In step C1, an address is set to the MAR, and the write data is set to the WDR 530 and the memory is activated in a step C2. A step C3 is a WAIT cycle in which the step C3 is continued until the access end signal is inputted in the same fashion as for the read operation.

If a page fault signal 52 is inputted during a WAIT cycle, the output from the AND gate 414 is set to 1 and the output from the AND gate 413 is set to $\phi$. The decoder 415 then sends to the selector 420 a signal 411A for selecting the first address of the page fault microprogram and then the selector 420 selects a page fault microprogram first address 420A. Then, beginning with the next step, the microprogram for processing the page fault exception is started.

Figure 12A:
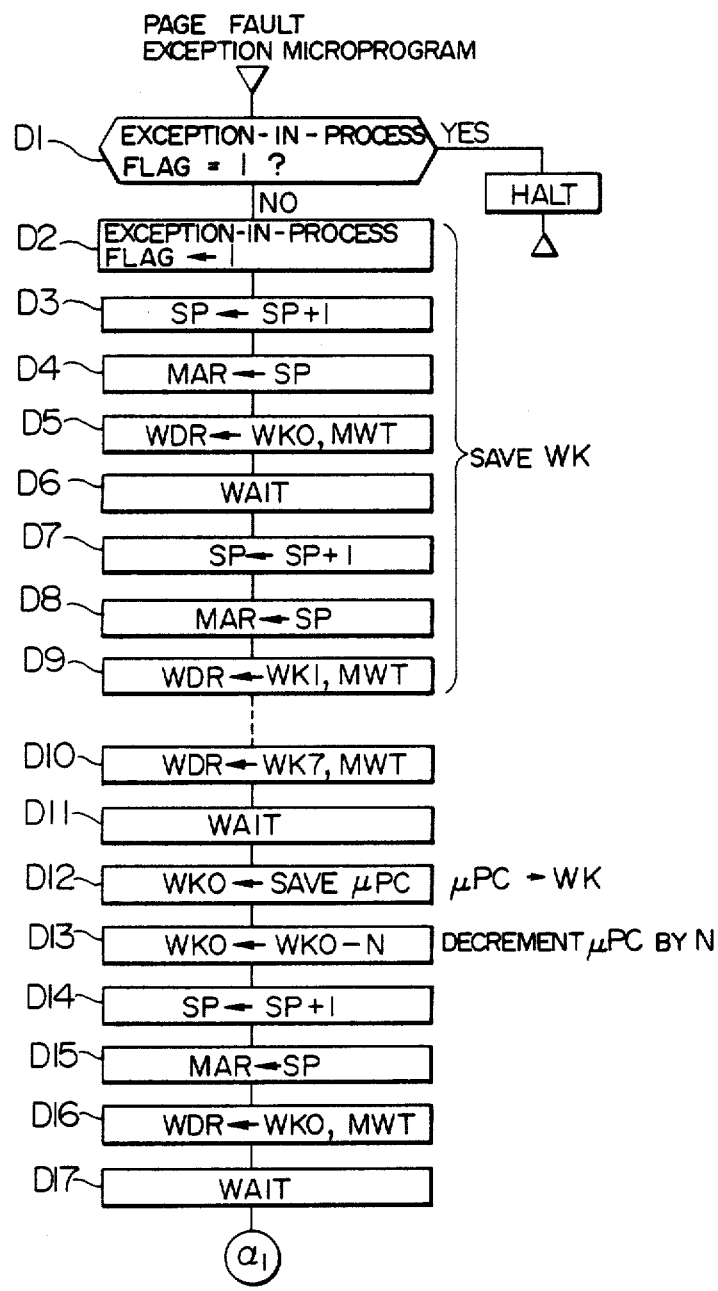
FIGS. 12A–12C are schematic diagrams illustrating microprograms for processing a page fault exception.
Figure 12B:
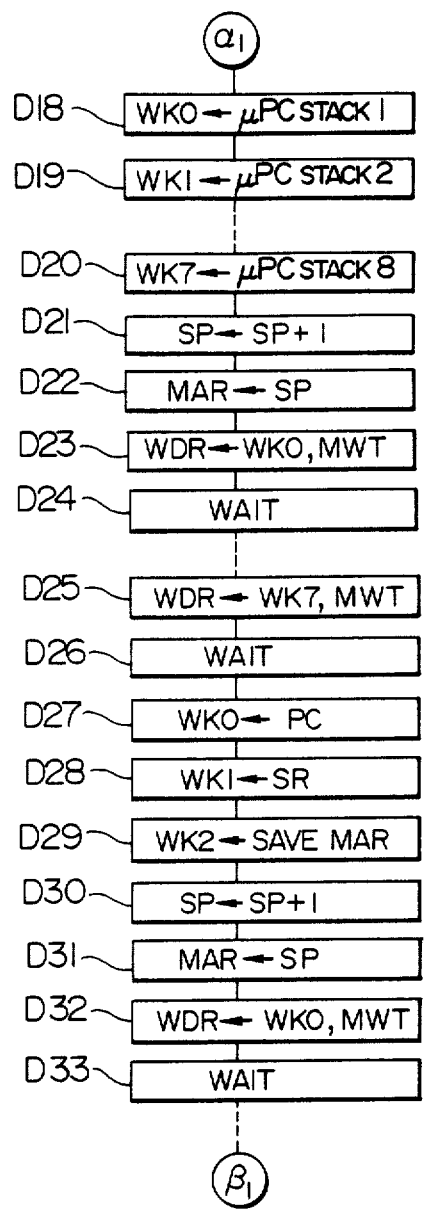
Figure 12C:
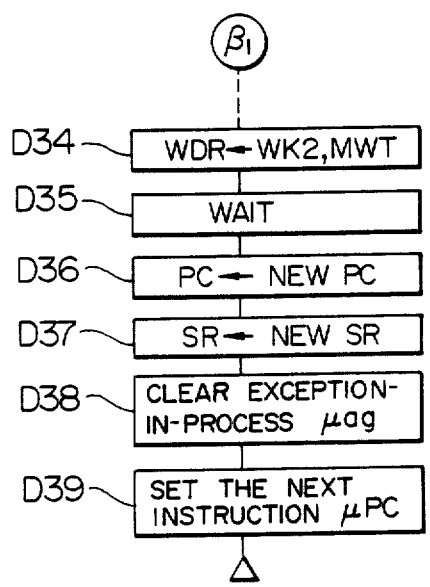

FIGS. 12A-12C are flowcharts demonstrating the microprogram flow for processing the page fault exception. In steps D3-D11, WK 320 is saved.

In a step D12, an address of the microprogram in the cycle in which the page fault is detected is transferred to the WKO. Since the page fault is detected only in the WAIT cycle, this address is the address of the step B2 of FIG. 11A for a read operation and is the address of the step C3 of FIG. 11B for a write operation. In the D13 cycle, the address transferred to the WKO, namely, the B2 or C3 address is decremented by one. This processing causes the content of WKO to be the B1 address of FIG. 11A or the C2 address of FIG. 11B. In steps D14-D17, the content of WKO is saved into the stack. Consequently, the address of the microprogram saved into the stack is the address of the step B1 or C2 of FIGS. 13A or 13B, respectively.

Steps D18-D26 save the microprogram counter stack, steps D27-D35 save the MAR, SR, and PC, and steps D36-D39 set the first address of the microprogram for processing the page fault exception, thereby terminating the microprogram for the page fault exception processing.

Figure 10:
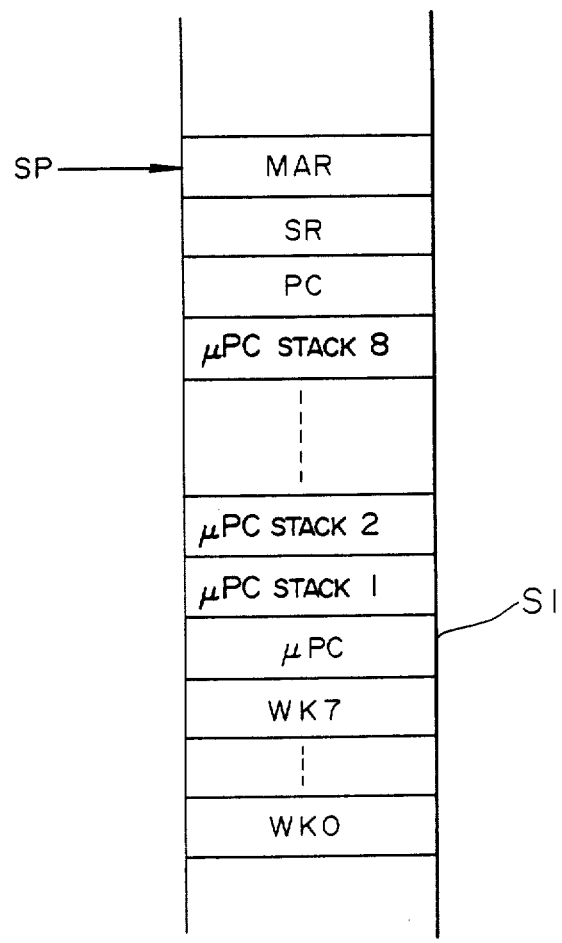
FIG. 10 is an explanatory diagram illustrating the contents of the stack when a page fault exception is executed.

FIG. 10 is a schematic diagram illustrating the contents of the stack after the page fault exception microprogram is executed. The S1 contains the address of the step B1 of FIG. 11A or the address of the step C2 of FIG. 11.

As shown in FIG. 2, the microprogram for processing the page fault exception loads the pertinent page 710 from the external storage 710 into the memory 600 and finally issues a return instruction, RTE.

Figure 13A:
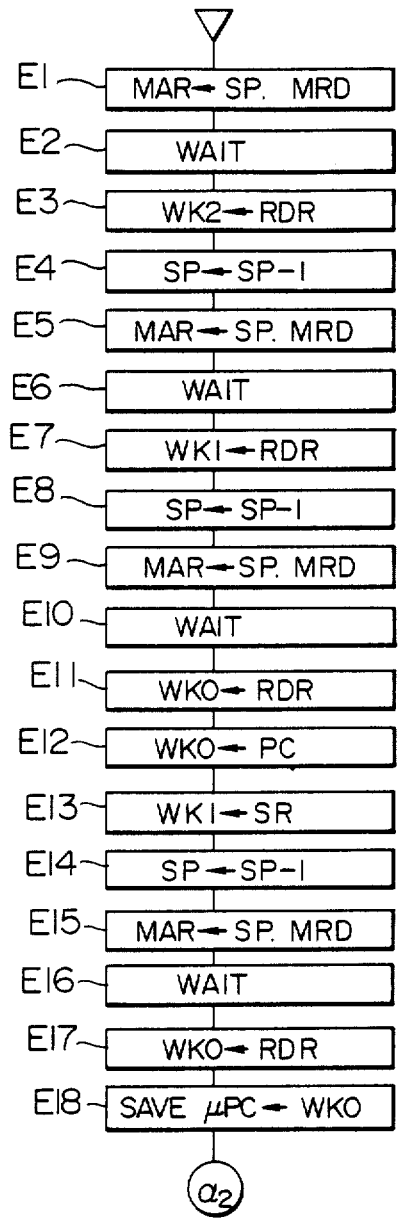
FIGS. 13A–13C are diagrams illustrating microprograms for a return instruction.
Figure 13B:
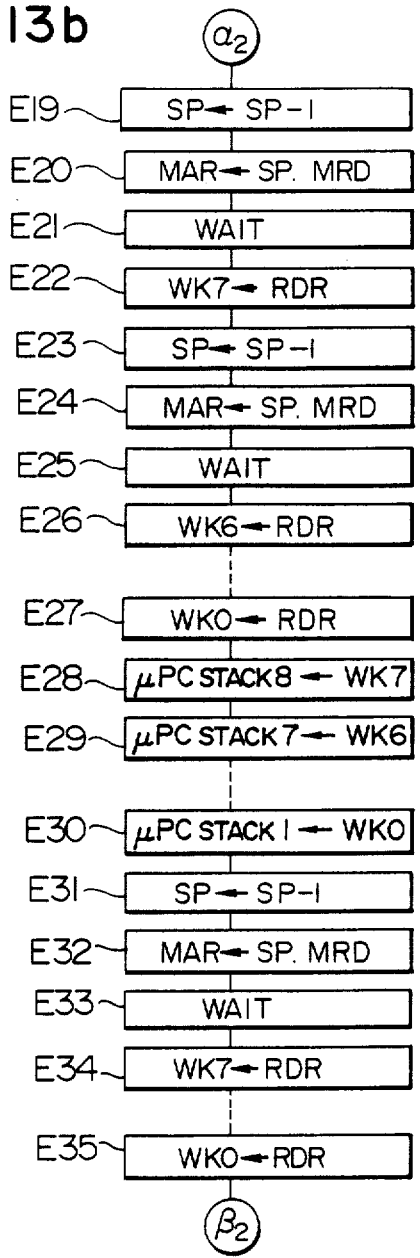
Figure 13C:
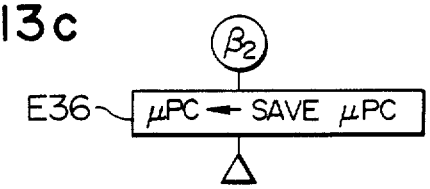

FIGS. 13A-13C are schematic diagrams illustrating the microprogram flow of the RTE instruction, which reads the contents of the stack saved by the microprogram for processing the page fault exception and sequentially restores the saved conditions. Steps E14-E18 read the content S1 of the microprogram counter from the stack and set the S1 to the Save microprogram counter 480. Step E36 sets the Save microprogram counter 480 to the microprogram counter 430. In the case of FIGS. 11A-11B, since the address of the step B1 or C2 has already been stored in the stack S1, the B1 or C2 address is set to the microprogram counter 430 and therefore the microprogram is started beginning from the B1 or C2 address.

According to the present invention as described above, the number of microprogram steps need not be increased for the ordinary processing and any dedicated hardware is not required, hence a method for restarting an execution interrupted due to a page fault can be implemented with a high hardware utilization efficiency.

We claim:

1. A method for restarting execution of an instruction interrupted due to a page fault in a data processing system having a main memory, means for storing microprograms of microinstructions, a microprogram counter for holding a microprogram address, a program counter for holding a program address, and an external memory, said method comprising the steps of:

- storing microinstructions, including a microinstruction for main memory access and a microinstruction for waiting for a reply to a main memory access for a fixed number N of operating steps after execution of said microinstruction for a main memory access;
- executing said microinstruction for main memory access without saving a current microprogram address;
- executing said microinstruction for waiting for a reply to a main memory access without incrementing said microprogram counter until a reply to the memory access is received;
- branching from said microinstruction for waiting for a reply to a main memory access to an exception processing microprogram when a reply to a main memory access is received and a page fault is indicated;
- executing said exception processing microprogram by saving a microprogram address which is obtained by substracting N from the address of said microinstruction for waiting for a reply to a main memory access and for setting a new program address in said program counter for executing a procedure for recovery of a page fault; and
- executing said procedure for recovery of a page fault by loading a page for which said page fault has occurred into said main memory from said external memory and resetting the program counter and restoring the microprogram address which is saved by said exception processing microprogram;

thereby effecting the restart of the instruction execution.

2. A method according to claim 1, wherein the microinstruction for waiting for a reply is executed at a next step of a microprogram following execution of the microinstruction for main memory access, and said exception processing microprogram includes a step of decrementing the saved microprogram address by one.

3. A method for restarting execution of an instruction interrupted due to a page fault in a data processing system having a main memory, means for storing microprograms of microinstructions, a microprogram counter for holding a microprogram address, a program counter for holding a program address, and an external memory, said method comprising the steps of:

- storing microinstructions, including a microinstruction for main memory access and a microinstruction for waiting for a reply to a main memory access for a fixed number N of operating steps after execution of said microinstruction for a main memory access;
- executing said microinstruction for main memory access without saving a current microprogram address;
- executing said microinstruction for waiting for a reply to a main memory access without incrementing said microprogram counter until a reply to the memory access is received;
- branching from said microinstruction for waiting for a reply to a main memory access to an exception processing microprogram when a reply to a main memory access is received and a page fault is indicated;
- executing said exception processing microprogram by saving a microprogram address of said microinstruction for waiting for a reply to a main memory access and for setting a new program address in said program counter for executing a procedure for recovery of a page fault; and
- executing said procedure for recovery of a page fault by loading a page for which said page fault has occurred into said main memory from said external memory and resetting the program counter and restoring the address which is obtained by subtracting N from the address which is saved by said exception processing microprogram;

thereby effecting the restart of the instruction execution.

4. A method according to claim 3, wherein the microinstruction for waiting for a reply is executed at a next step of a microprogram following execution of the microinstruction for main memory access, and said procedure for recovery of a page fault includes a step of decrementing by one the microprogram address saved during execution of said exception processing microprogram.

* * * * *